(12) United States Patent
Dowd et al.

(10) Patent No.: US 8,934,044 B2
(45) Date of Patent: Jan. 13, 2015

(54) SYSTEMS AND METHODS FOR LIVE VIEW PHOTO LAYER IN DIGITAL IMAGING APPLICATIONS

(75) Inventors: Geoffrey Dowd, San Francisco, CA (US); Andreas Wurf, Hamburg (DE); Thomas Muehrke, Hamburg (DE)

(73) Assignee: Adobe Systems Incorporated, San Jose, CA (US)

( * ) Notice: Subject to any disclaimer, the term of this patent is extended or adjusted under 35 U.S.C. 154(b) by 144 days.

(21) Appl. No.: 13/553,903

(22) Filed: Jul. 20, 2012

(65) Prior Publication Data

US 2014/0022396 A1 Jan. 23, 2014

(51) Int. Cl.
*H04N 5/222* (2006.01)
(52) U.S. Cl.
USPC .................. 348/333.12; 348/222.1; 348/239; 348/333.05
(58) Field of Classification Search
CPC ....................................................... H04N 5/272
USPC .......... 348/222.1, 211.4, 239, 333.05, 333.12
See application file for complete search history.

(56) References Cited

U.S. PATENT DOCUMENTS

| | | | |
|---|---|---|---|
| 5,990,901 A | 11/1999 | Lawton et al. | |
| 7,545,994 B2 | 6/2009 | Reid | |
| 7,787,664 B2 | 8/2010 | Luo et al. | |
| 2003/0210335 A1 | 11/2003 | Carau, Sr. et al. | |
| 2006/0077266 A1* | 4/2006 | Nurmi | 348/239 |
| 2010/0031149 A1* | 2/2010 | Gentile et al. | 715/723 |
| 2010/0053342 A1* | 3/2010 | Hwang et al. | 348/207.99 |
| 2012/0185768 A1* | 7/2012 | Dowd | 715/702 |

OTHER PUBLICATIONS

Agarwala, A. et al., Interactive Digital Photomontage, Interactive Digital Photomontage. ACM Transactions on Graphics (Proceedings of SIGGRAPH 2004), 2004.
Bradley, H., Digital Photography School: Smarter Content Aware Fill in Photoshop, Web page available at http://www.digital-photography-school.com/smarter-content-aware-fill-i . . . , as available via the Internet and printed Nov. 8, 2011.
Szeliski, R., Image Alignment and Stitching: A Tutorial, Microsoft Research, web page available at http://www.research.microsoft.com, as available via the Internet, dated 2006.
Pano Website, Debacle Software, web page available at http://www.debaclesoftware.com/iOS/, as available via the Internet and printed Jul. 6, 2011.
All About Linux: Resynthesizer GIMP Plugin—Selectively Remove Objects from Pictures, web page available via http://linuxhelp.blogspot.com/2010/05/resynthesizer-gimp-plugin-selecti . . . , as available via the Internet via Nov. 8, 2011.

* cited by examiner

*Primary Examiner* — Antoinette Spinks
(74) *Attorney, Agent, or Firm* — Kilpatrick Townsend & Stockton LLP

(57) ABSTRACT

In response to receiving, by an image editing application, selection of a layer from an image comprising at least two layers, selecting the layer in the image editing application. A view from a camera may be rendered by the image editing application in at least a portion of the selected layer. In response to receiving, by the image editing application, an input indicating that the view from the camera should be captured, the view from the camera can be captured. The captured view from the camera may be inserted into the at least the portion of the selected layer by the image editing application.

20 Claims, 14 Drawing Sheets

SYSTEMS AND METHODS FOR LIVE VIEW PHOTO LAYER IN DIGITAL IMAGING APPLICATIONS

FIELD OF THE INVENTION

This disclosure relates generally to creating digital images and more particularly relates to a live view photo layer for a digital image.

BACKGROUND

Traditionally, creating an image layer containing a digital image captured from a digital camera required a user to capture an image with a digital camera and transfer the captured image to a computing device. Then, the user could create a new image or open a preexisting image in an image editing application that contains a layer in which the captured image can be inserted. Next, the user would open the captured image in the image editing application, select the captured image, and cut-and-paste the captured image into the layer of the new or preexisting image. Accordingly, there is a need for efficient systems and methods for capturing and including captured images in a layer of an image in these and other circumstances.

SUMMARY

One exemplary embodiment involves a method comprising, in response to receiving, by an image editing application, selection of a layer from an image comprising at least two layers, selecting the layer in the image editing application. In this exemplary embodiment the method further comprises, rendering, by the image editing application, a view from a camera in at least a portion of the selected layer. In this exemplary embodiment the method further comprises, in response to receiving, by the image editing application, an input indicating that the view from the camera should be captured, capturing the view from the camera. In this exemplary embodiment the method further comprises, inserting, by the image editing application, the captured view from the camera into the at least the portion of the selected layer.

In another embodiment, a non-transitory computer-readable medium, comprises program code for: in response to receiving, by an image editing application, selection of a layer from an image comprising at least two layers, selecting the layer in the image editing application; rendering, by the image editing application, a view from a camera in at least a portion of the selected layer; in response to receiving, by the image editing application, an input indicating that the view from the camera should be captured, capturing the view from the camera; and inserting, by the image editing application, the captured view from the camera into the at least the portion of the selected layer.

In yet another embodiment, a system comprises a display; a camera; an input device; a memory; and a processor in communication with the display, the camera, the input device, and the memory. In this embodiment, the processor is configured for: rendering, by an image editing application, an image comprising at least two layers on the display; receiving, by the image editing application, a first input from the input device, the first input indicating selection of a layer from the at least two layers; in response to receiving, by the image editing application, the first input, selecting the layer in the image editing application; rendering, by the image editing application, a view from the camera in at least a portion of the selected layer on the display; receiving, by the image editing application, a second input from the input device, the second input indicating that the view from the camera should be captured; in response to receiving, by the image editing application, capturing the view from the camera; and inserting, by the image editing application, the captured view from the camera into the at least the portion of the selected layer.

These illustrative features are mentioned not to limit or define the disclosure, but to provide examples to aid understanding thereof. Additional embodiments are discussed in the Detailed Description, and further description is provided there. Advantages offered by one or more of the embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
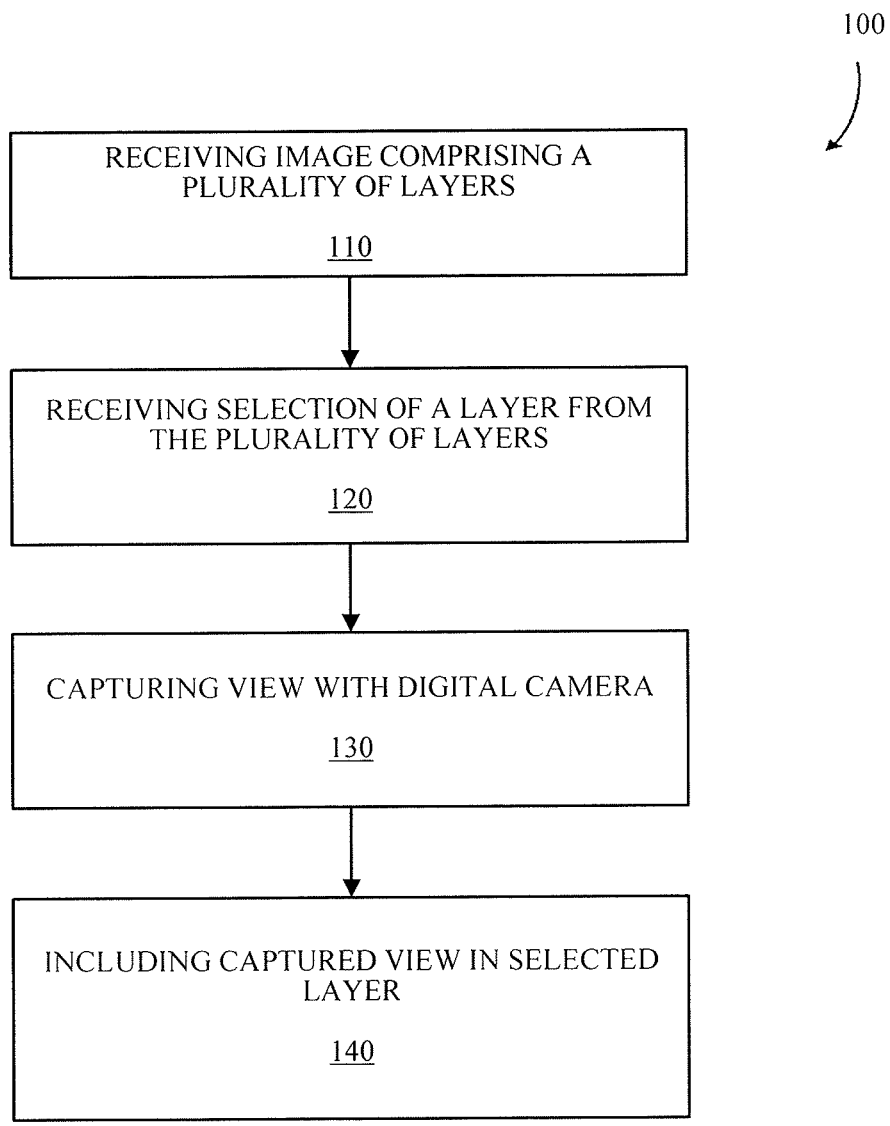
FIG. 1 is a flow chart directed to a method of including a live view photo layer in an image according to an embodiment.

Systems and methods disclosed herein relate generally to including a live view photo layer in an image according to an embodiment. For example, FIG. 1 illustrates a flow chart directed to a method 100 of including a live view photo layer in an image according to an embodiment. Such a method 100 may be performed by one or more electronic devices, such as a tablet computer, mobile phone, or other computing device comprising and/or in communication with a camera and an input device such as a mouse, keyboard, touch-screen, or other input device.

The method 100 shown in FIG. 1 begins in block 110 when an image comprising a plurality of layers is received. For example, an image editing application being executed on an electronic device may open an image comprising a plurality of layers from a disk drive associated with the electronic device. As another example, an electronic device may receive an image comprising a plurality of layers from another device through a network interface associated with the electronic device.

Once the image comprising the plurality of layers is received 110, selection of a layer from the plurality of layers is received 120. For example, in one embodiment, a thumbnail image for each of the plurality of layers is displayed on a display associated with the electronic device. In this embodiment, a layer may be selected by using a mouse to position a cursor over the thumbnail image corresponding to the layer and clicking a button on the mouse. As another example, if the electronic device comprises a touch-screen display, then a user may be able to select a particular layer by contacting a location of the touch-screen display corresponding to the thumbnail image corresponding to that layer.

After receiving the selection of the layer from the plurality of layers 120, a view from a digital camera within the electronic device and/or a digital camera in communication with the electronic device is captured 130. For example, a live view from the digital camera may be displayed within the selected layer. In one embodiment, at least one of the other layers from the plurality of layers is also displayed. For example, one or more layers of the image ordered above the selected layer may be displayed in addition to the live view from the digital camera. In one embodiment, at least portion of one of the other layers is at least partially transparent and/or translucent so that the live view can be seen through the other layers. The image may be captured by a user pressing a button that indicates that the digital camera should capture the current view of the digital camera. As another example, if the electronic device comprises a touch-screen, a user may touch a location of the touch-screen corresponding to an image capture icon.

Once the view from the digital camera is captured 130, the captured view is included within the selected layer 140. For example, in an embodiment, the entire captured view is included in the selected layer. In another embodiment, a portion of the captured view is included in at least a portion of the selected layer. In this way, according to an embodiment, a user of an electronic device can insert a view from a digital camera into a selected layer of an image without having to cut-and-paste a previously captured image into a layer of another image.

These illustrative examples are given to introduce the reader to the general subject matter discussed here and are not intended to limit the scope of the disclosed concepts. The following sections describe various additional embodiments and examples with reference to the drawings in which like numerals indicate like elements. Other embodiments will readily suggest themselves to such skilled persons having the benefit of this disclosure. In the interest of clarity, not all of the routine features of the implementations described herein are shown and described. It will, of course, be appreciated that in the development of any such actual implementation. numerous implementation-specific decisions must be made in order to achieve the developer's specific goals, such as compliance with application-related or business-related constraints, or both, and that these specific goals will vary from one implementation to another and from one developer to another.

Terms

The following terms are used in descriptions of embodiments disclosed herein.

Layer: A layer is a component of an image. In some embodiments, an image comprises a single layer. In other embodiments, an image comprises two or more layers. In this embodiment, a layer of the image may be positioned above or below another layer of the image.

Live View: A live view is a real-time view. For example, a live view can be a real-time view from a camera. A live view may be a real-time view from a digital camera shown on a viewfinder associated with the digital camera. As another example, a live view can be a real-time view from a digital camera being displayed on a display associated with the digital camera. A live view may enable a user to preview what an image will look like before the image is captured by the digital camera. For example, a live view may show a current view from a digital camera. In this embodiment, as the digital camera is moved or as settings associated with the digital camera are changed (e.g., zoom, focus, etc.), the live view is updated in real-time and/or substantially real-time. Numerous other embodiments are disclosed herein and variations are within the scope of this disclosure.

Camera Fill View: A camera fill view is the display of at least a portion of a layer of an image and at least a portion of a live view. For example, a camera fill view may be the simultaneous display of one layer of an image and a live view within the layer of the image. As another example, a camera fill view can be the display of one layer of an image having three layers and a live view within a portion of the displayed layer of the image. In yet another example, a camera fill view can be the display of at least two layers of an image having at least two layers and the display of a live view within a portion of at least one of the at least two layers of the image. Numerous other embodiments are disclosed herein and variations are within the scope of this disclosure.

Illustrative Electronic Device

Figure 2:
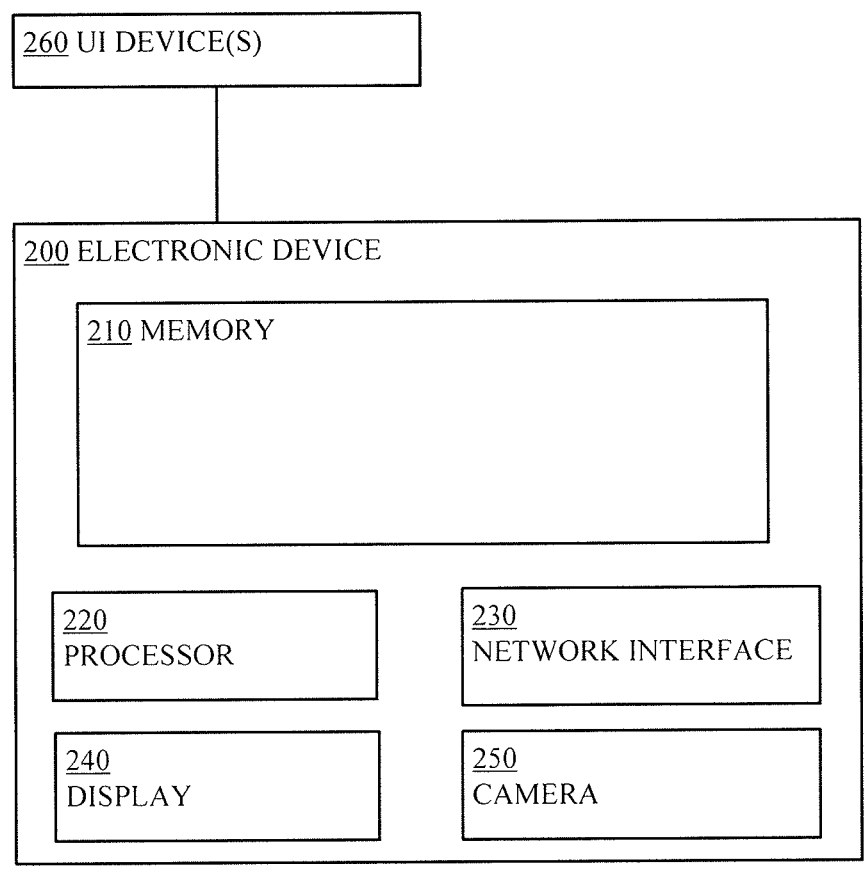
FIG. 2 is a block diagram depicting an exemplary electronic device according to an embodiment.

FIG. 2 is a block diagram depicting an exemplary electronic device according to an embodiment. For example, in one embodiment, electronic device 200 is a tablet computer. In other embodiments, electronic device 200 can be a mobile phone, a personal digital assistant (PDA), a laptop, a desktop computer, or another suitable computing device. An electronic device may include additional or fewer components than the electronic device 200 shown in FIG. 2. For example, in an embodiment, an electronic device comprises the memory 210, the processor 220, the network interface 230, and the display 240 but does not include a camera. In this embodiment, the electronic device 200 may be in communication with a camera. As another example, in one embodiment, the electronic device 200 does not comprise a network interface 230. Numerous configurations having fewer or additional components for the electronic device 200 are within the scope of this disclosure.

As shown in FIG. 2, the electronic device 200 comprises a computer-readable medium 210, such as a random access memory (RAM), coupled to a processor 220 that executes computer-executable program instructions and/or accesses information stored in memory 210. A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, SRAM, DRAM, CAM, DDR, flash memory such as NAND flash or NOR flash, an ASIC, a configured processor, optical storage, magnetic tape or other magnetic storage, or any other medium from which a computer processor can read instructions. In one embodiment, the electronic device 200 may comprise a single type of computer-readable medium such as random access memory (RAM). In other embodiments, the electronic device 200 may comprise two or more types of computer-readable medium such as random access memory (RAM), a disk drive, and cache. The electronic device 200 may be in communication with one or more external computer-readable mediums such as an external hard disk drive or an external DVD drive.

The embodiment shown in FIG. 2, comprises a processor 220 which executes computer-executable program instructions and/or accesses information stored in memory 210. The instructions may comprise processor-specific instructions generated by a compiler and/or an interpreter from code written in any suitable computer-programming language including, for example, C, C++, C#, Visual Basic, Java, Python, Perl, JavaScript, and ActionScript®. In an embodiment, the electronic device 200 comprises a single processor 220. In other embodiments, the electronic device 200 comprises two or more processors.

The electronic device 200 as shown in FIG. 2 comprises a network interface 230 for communicating via wired or wireless communication. For example, the network interface 230 may allow for communication over networks via Ethernet, IEEE 802.11 (Wi-Fi), 802.16 (Wi-Max), Bluetooth, infrared, etc. As another example, network interface 230 may allow for communication over networks such as CDMA, GSM, UMTS, or other cellular communication networks. The electronic device 200 may comprise two or more network interfaces 230 for communication over one or more networks.

The electronic device 200 may comprise or be in communication with a number of external or internal devices such as a mouse, a CD-ROM, DVD, a keyboard, a display, audio speakers, one or more microphones, or any other input or output devices. For example, the electronic device 200 shown in FIG. 2 comprises a display 240 and a camera 250 and is in communication with various user interface (UI) devices 260. Display 240 may use any suitable technology including, but not limited to, LCD, LED, CRT, and the like. In one embodiment, the display 240 is a touch-sensitive display. In other embodiments, the display 240 is not touch-sensitive. In one embodiment, the camera 250 is a rear-facing camera that faces a direction opposite or substantially opposite of the display 240. For example, the camera 250 may be located on a back portion of a housing associated with the electronic device 200 and the display 240 may be located on a front portion of the house associated with the electronic device 200. In other embodiments, the camera faces a direction that is the same or substantially the same as the display 240.

Electronic device 200 may be a tablet computer, a personal computing device, a mobile phone, a desktop computer, or any other electronic device suitable for providing one or more of the features described herein.

Illustrative System

Figure 3:
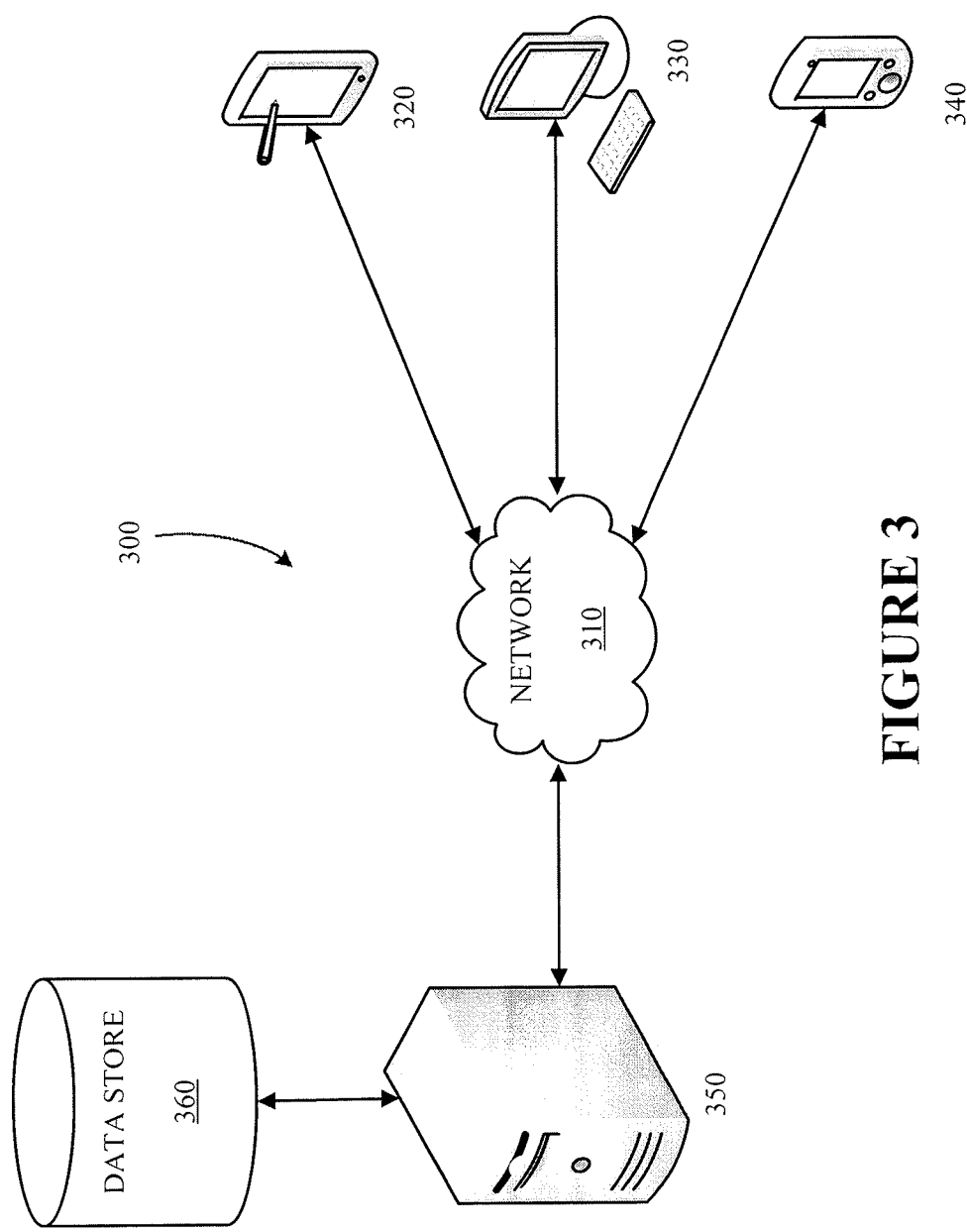
FIG. 3 is a system diagram depicting exemplary computing devices in an exemplary computing environment according to an embodiment.

FIG. 3 illustrates a system diagram depicting exemplary computing devices in an exemplary computing environment according to an embodiment. The system 300 shown in FIG. 3 includes three electronic devices, 320-340, and a web server 350. Each of the electronic devices, 320-340, and the web server 350 are connected to a network 310. In this embodiment, each of the electronic devices, 320-340, is in communication with the web server 350 through the network 310. Thus, each of the electronic devices, 320-340, can send requests to the web server 350 and receive responses from the web server 350 through the network 310.

In an embodiment, the network 310 shown in FIG. 3 facilitates communications between the electronic devices, 320-340, and the web server 350. The network 310 may be any suitable number or type of networks or links, including, but not limited to, a dial-in network, a local area network (LAN), wide area network (WAN), public switched telephone network (PSTN), the Internet, an intranet or any combination of hard-wired and/or wireless communication links. In one embodiment, the network 310 may be a single network. In other embodiments, the network 310 may comprise two or more networks. For example, the electronic devices 320-340 may be connected to a first network and the web server 350 may be connected to a second network and the first and the second network may be connected. Numerous other network configurations are disclosed herein and others are within the scope of this disclosure.

An electronic device may be capable of communicating with a network, such as network 310, and be capable of sending and receiving information to and from another device, such as web server 350. For example, in FIG. 3, one electronic device may be a tablet computer 320. The tablet computer 320 may include a touch-sensitive display and be able to communicate with the network 310 by using a wireless network interface card. In this embodiment, the tablet computer 320 may be able to receive and display live views from a camera associated with the web server 350 through the network 310. In another embodiment, the tablet computer 320 comprises a camera. The tablet computer 320 may or may not be in communication with network 310 according to various embodiments. Another device that may be an electronic device shown in FIG. 3 is a desktop computer 330. The desktop computer 330 may be in communication with a display and be able to connect to the network 330 through a wired network connection. The desktop computer 330 may be in communication with any number of input devices such as a keyboard of a mouse. In FIG. 3, a mobile phone 340 may be an electronic device. The mobile phone 340 may be able to communicate with the network 310 over a wireless communications means such as TDMA, CDMA, GSM, or WiFi. Numerous other embodiments are disclosed herein and others are within the scope of this disclosure.

A device receiving a request from another device may be any device capable of communicating with a network, such as network 310, and capable of sending and receiving information to and from another device. For example, in the embodiment shown in FIG. 3, the web server 350 may be a device receiving a request from another device (i.e. electronic devices 320-340) and may be in communication with network 310. A receiving device may be in communication with one or more additional devices, such as additional servers. For example, web server 350 in FIG. 3 may be in communication with another server that is in communication with a camera and/or stores full resolution images, lower resolution copies of full resolution images, one or more layers of an image, thumbnail images, information associated with one or more images, user account information etc. In one embodiment, the web server 350 may store images comprising a plurality of layers, images associated with one or more layers of another image, thumbnail images of other images, composite images, other images or information associated with images, or some combination thereof on a disk drive or in cache, or both. In an embodiment, a web server may communicate with one or more additional devices to process a request received from an electronic device. For example, web server 350 in FIG. 3 may be in communication with a plurality of additional servers, at least one of which may be used to process at least a portion of a request from any of the electronic devices 320-340. In one embodiment, web server 350 may be part of or in communication with a content distribution network (CDN) that stores data related to one or more images.

One or more devices may be in communication with a data store. For example, in FIG. 3, web server 350 is in communication with data store 360. In embodiments, data store 360 is operable to receive instructions from web server 350 and/or other devices in communication with data store 360 and obtain, update, or otherwise process data in response to receiving the instructions. Data store 360 may contain information associated with images having a plurality of layers, one or more layers of an image, full resolution images, reduced resolution images, full sized images, reduced sized images, composite images, thumbnail images, image location, account information, etc. For example, data store 360 may contain an image identifier that is usable to determine a location where the image is stored. Data store 360 may contain layer identifiers that are usable to identify one or more layers associated with an image. In one embodiment, a layer identifier is usable to determine a location where a thumbnail image of the layer is stored.

Data store 360 shown in FIG. 3 can receive requests from web server 350 and send responses to web server 350. For example, web server 350 may request a listing of the layers associated with an image corresponding to a particular image identifier. As another example, web server 350 may request the name of an image having a layer corresponding to a particular layer identifier. In response to receiving the request, data store 360 may send the requested information about one or more images, one or more layers of an image, and/or other information to web server 350. In embodiments, data store 360 can send receive, add, update, or otherwise manipulate information based at least in part on one or more requests received from another device or network, such as web server 350, network 310, or another network or device in communication with data store 360. For example, web server 350 may query data store 360 to determine whether information associated with a particular layer of an image should be sent to an electronic device in response to the web server 350 receiving a request from the electronic device.

Method of Inserting a View From a Camera Into a Layer of an Image

Figure 4:
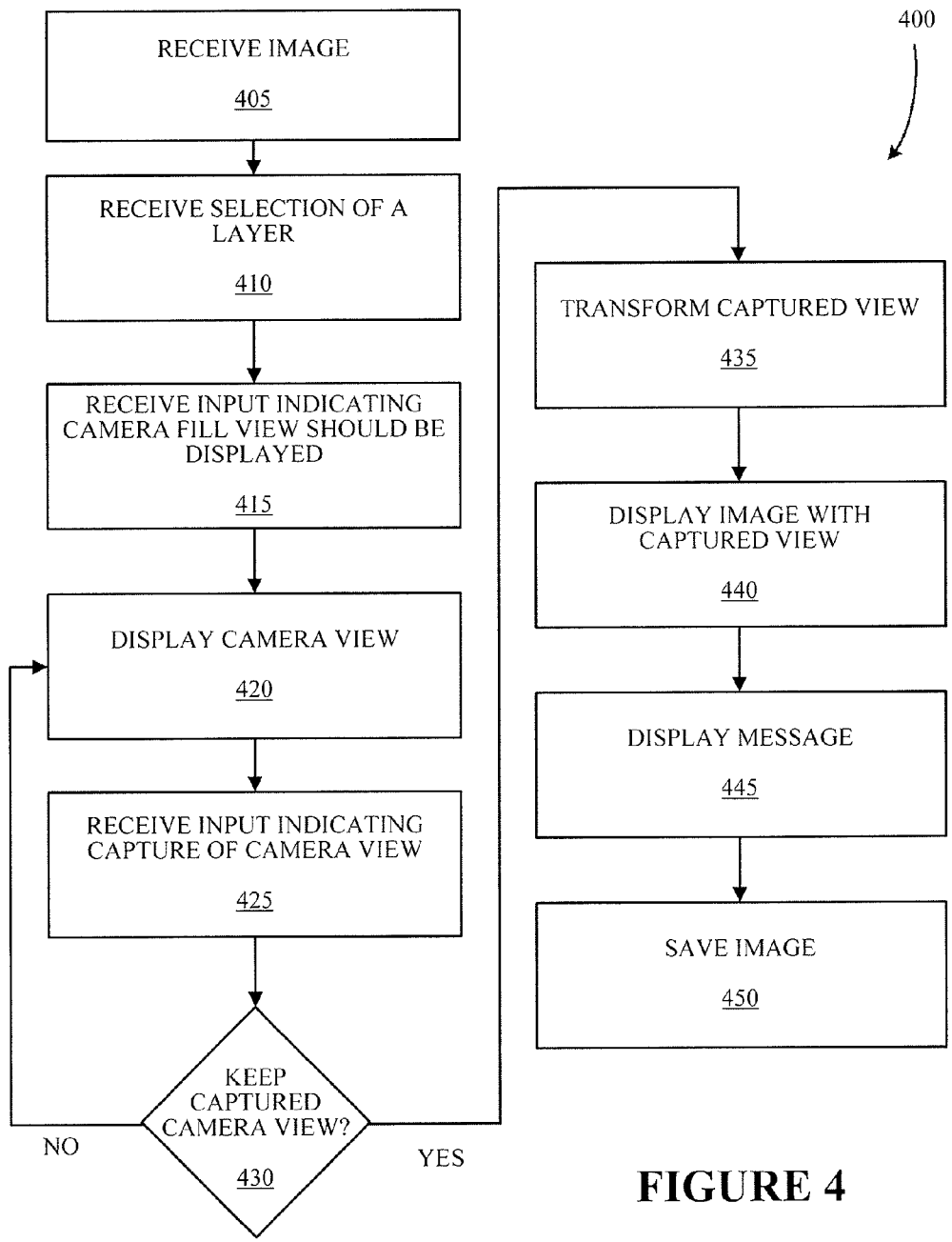
FIG. 4 is a flow chart illustrating a method of inserting a view from a camera into a layer of an image according to an embodiment.

Referring now to FIG. 4, FIG. 4 is a flow chart illustrating a method of inserting a view from a camera into a layer of an image according to an embodiment. The description of the method 400 of FIG. 4 will be made with respect to FIGS. 2 and 3. The description of the method 400 of FIG. 4 will also be made with respect to FIGS. 5A-5J which are simulated displays that illustrate aspects according to various embodiments.

The method 400 shown in FIG. 4 begins when an image is received 405. For example, referring to FIG. 2, the processor 220 of the electronic device 200 may receive an image from the memory 210. In another embodiment, the electronic device 200 may receive an image from another device through the network interface 230 or from a hard disk drive or other storage device. For example, referring to FIG. 3, tablet computer 320 may receive an image stored at web server 350 and/or data store 360 through network 310. The web server 350 may send the image to the tablet computer 320 in response to receiving a request from the tablet computer 320. In other embodiments, the web server 350 pushes the image to the tablet computer 320 without receiving a request from the tablet computer 320. The image may be received by an image editing application being executed on the electronic device 200. For example, referring to FIG. 2, the memory 210 may have program code stored thereon for an image editing application. In this embodiment, the processor 220 may receive the program code for the image editing application from the memory 210 and execute at least a portion of the program code for the image editing application. In another embodiment, the processor 220 receives program code for an image editing application from another device through the network interface 230. For example, referring to FIG. 3, tablet computer 320 may receive program code for an image editing application stored at web server 350 and/or data store 360 through network 310.

In one embodiment, the received image 405 comprises a plurality of layers. For example, referring to FIG. 5A, the image comprises five layers. In this embodiment, each layer is indicated by a thumbnail image corresponding to that layer. In another embodiment, the received image 405 comprises a single layer. An image editing application may be capable of manipulating the image to increase and/or decrease the number of layers in the image. For example, if an image comprises a single layer, then the image editing application can be used to add a second layer to the image. As another example, the image editing application can be used to remove the third layer of an image comprising four layers. Numerous other embodiments with respect to manipulating layers of an image and/or functionalities of an image editing application are disclosed herein and variations are within the scope of this disclosure.

Referring back to FIG. 4, after receiving the image 405, the method 400 proceeds to block 410. In block 410, a selection of a layer of the image is received. For example, if an image comprises three layers (e.g., layer 1, layer 2, and layer 3) then one of the three layers can be selected.

A layer of an image can be selected in any number of ways. For example, referring to FIG. 3, tablet computer 320 may comprise a touch-screen that can be used to receive input from a user of the tablet computer 320 that indicates which layer of the image should be selected. In one embodiment, an image editing application being executed on the tablet computer 320 displays a thumbnail image for at least a subset of the layers in the received image on the touch-screen display of the tablet computer 320. In this embodiment, when the touch-sensitive display of the tablet computer 320 is contacted at a location corresponding to a thumbnail image, then the layer of the image corresponding to that thumbnail image is selected. For example, referring to the embodiment shown in FIG. 5A, when a user contacts the touch-screen of the electronic device 200 at a location corresponding to a thumbnail image that corresponds with the third layer, then the third layer is selected. In this embodiment, a visual indication of the selected layer is displayed on the display of the electronic device 200. For example, in FIG. 5A, the thumbnail image that corresponds to the third layer of the image has a white background because this layer has been selected.

In another embodiment, if the electronic device 200 comprises or is in communication with a mouse, then a cursor for the mouse may be pointed to a location on the display corresponding to a particular layer of the image. In this embodiment, the particular layer of the image is selected when a button associated with the mouse is clicked while the cursor is pointed to the location on the display corresponding to the particular layer. In yet another embodiment, a particular key sequence may be received which indicates a particular layer of the image that should be selected. For example, if the electronic device 200 receives a key sequence of "ctrl" and "3", then an image editing application being executed on the electronic device may select the third layer of the received image. In an embodiment, the selection of layer may be based at least in part on an input for changing a focus of a layer for editing. For example, an image may have three layers and an input can be received that changes the focus to the third layer such that the third layer of the image can be edited. In another embodiment, the selection of the layer occurs automatically. For example, a selection of a layer may be determined by an algorithm that automatically selects a layer of an image or a portion of a layer of an image, or both. In one embodiment, the selection of a layer of an image automatically occurs when the image is opened in an image editing application. In another embodiment, the selection of a layer of an image is based at least in part on a default layer for the image. Numerous other embodiments are disclosed herein and variations are within the scope of this disclosure.

In one embodiment, the electronic device 200 receives selection of a layer of the image from one or more user interface (UI) devices comprised in the electronic device 200, such as display 240. For example, referring to FIG. 5A, the third layer of the image may be selected by contacting the touch-sensitive display at a location corresponding to the third thumbnail image which also corresponds to the third layer of the image. In another embodiment, the electronic device 200 receives selection of a layer of the image from one or more user interface (UI) devices in communication with the electronic device 200, such as UI device(s) 260. In yet another embodiment, the electronic device 200 receives selection of a layer of the image from another device through network interface 230. For example, referring to FIG. 3, tablet computer 320 may receive selection of a layer of the image from mobile phone 340. In this embodiment, tablet computer 320 may send information to the mobile phone 340 that is used to render information regarding the image, such as layers of the image or thumbnail images corresponding to the layers of the image, to the display of the mobile phone 340. A user of the mobile phone may select a particular layer through interaction with the display and/or the buttons or other input devices of the mobile phone 340. In this embodiment, the mobile phone 340 can send information regarding the user input to tablet computer 320 through network 310. The tablet computer 320 may determine a particular layer of the image that should be selected based on the information received from the mobile phone 340 and may select the determined layer. Numerous other embodiments are disclosed herein and variations are within the scope of this disclosure.

Referring back to FIG. 4, after receiving selection of a layer 410, the method 400 proceeds to block 415. In block 415, an input indicating that a camera fill view should be displayed is received. For example, a user may contact a particular location on a touch-sensitive display that indicates that a camera fill view should be displayed.

Figure 5A:
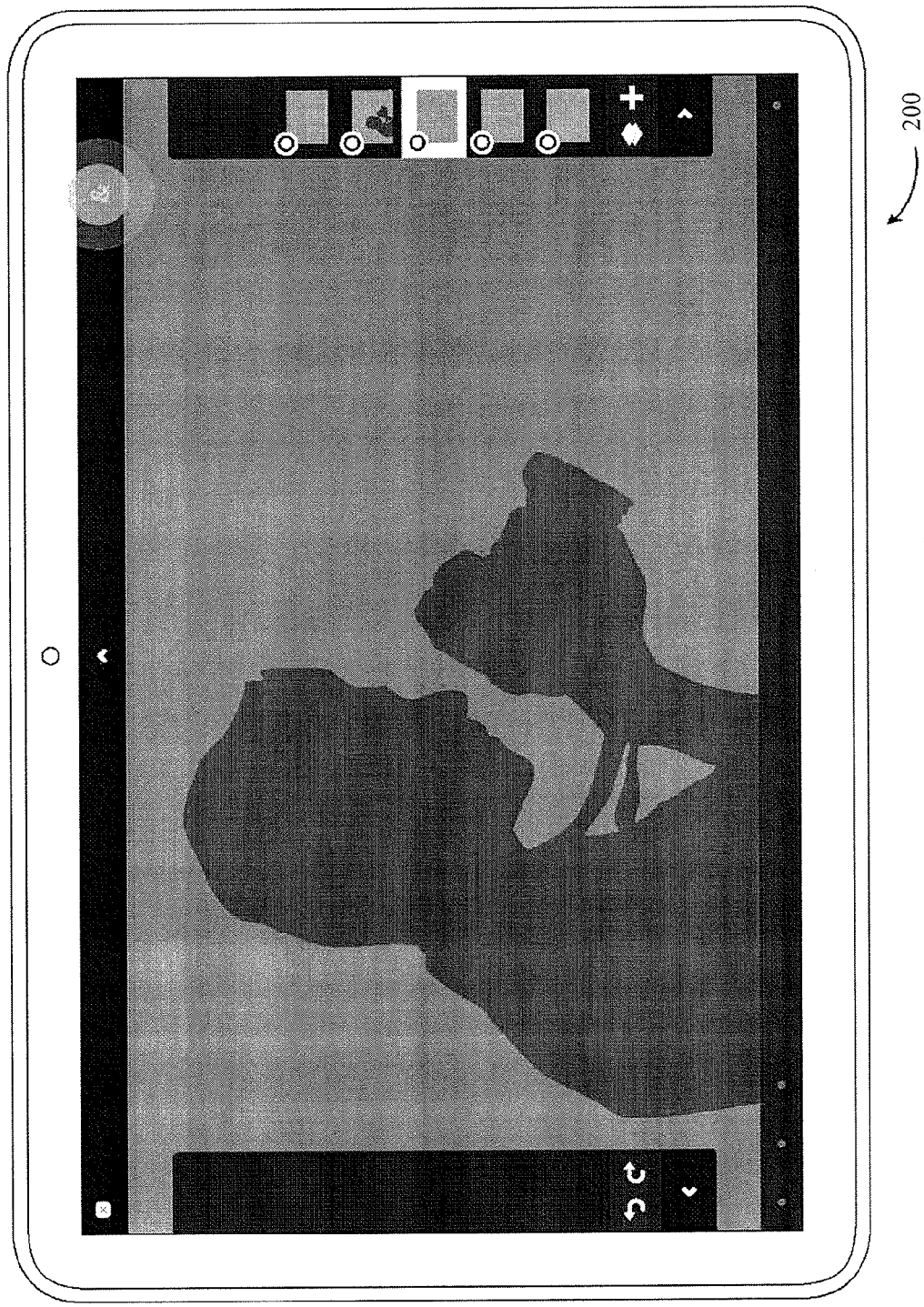
FIGS. 5A-J are simulated displays that illustrate aspects according to various embodiments.
Figure 5B:
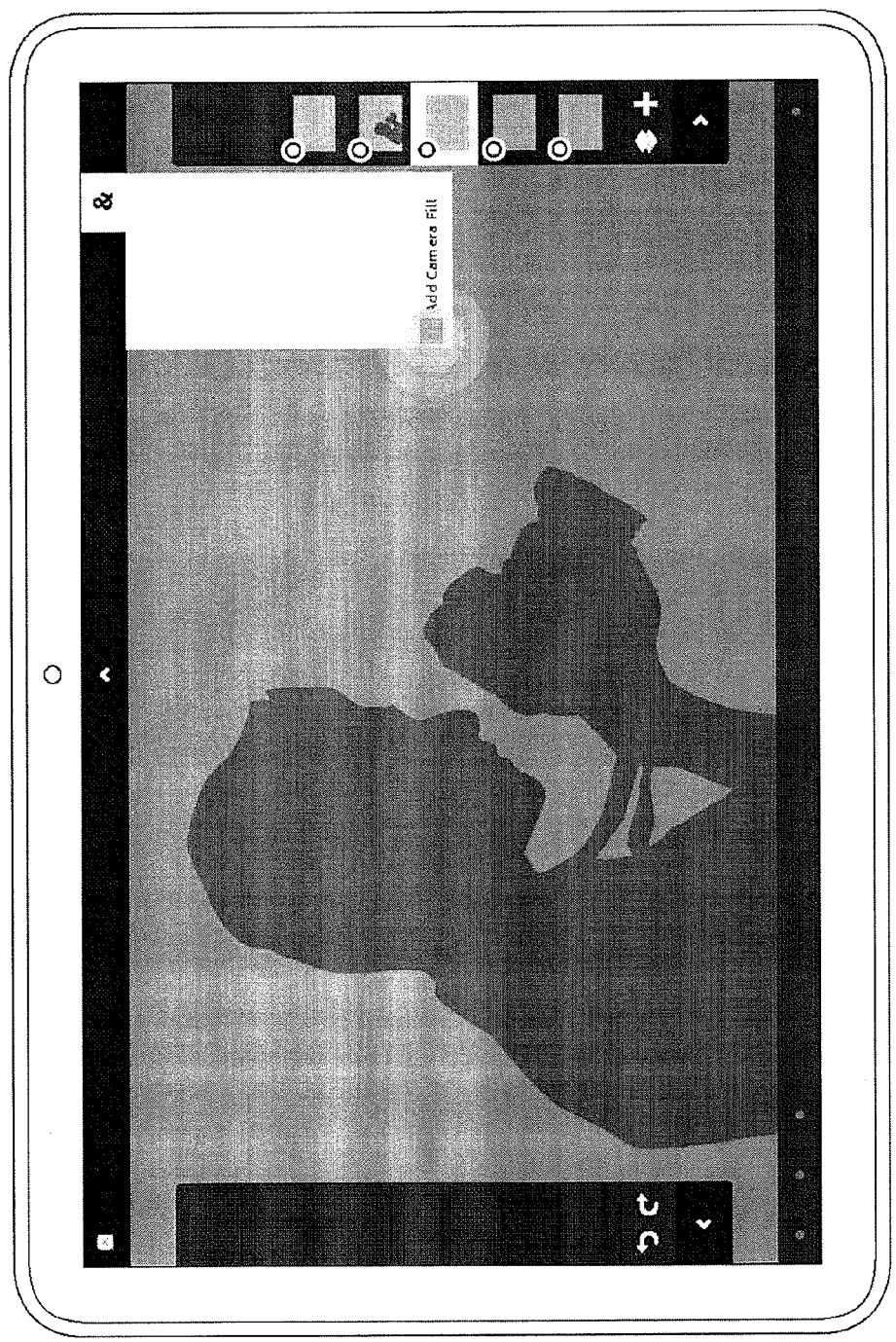
Figure 5C:
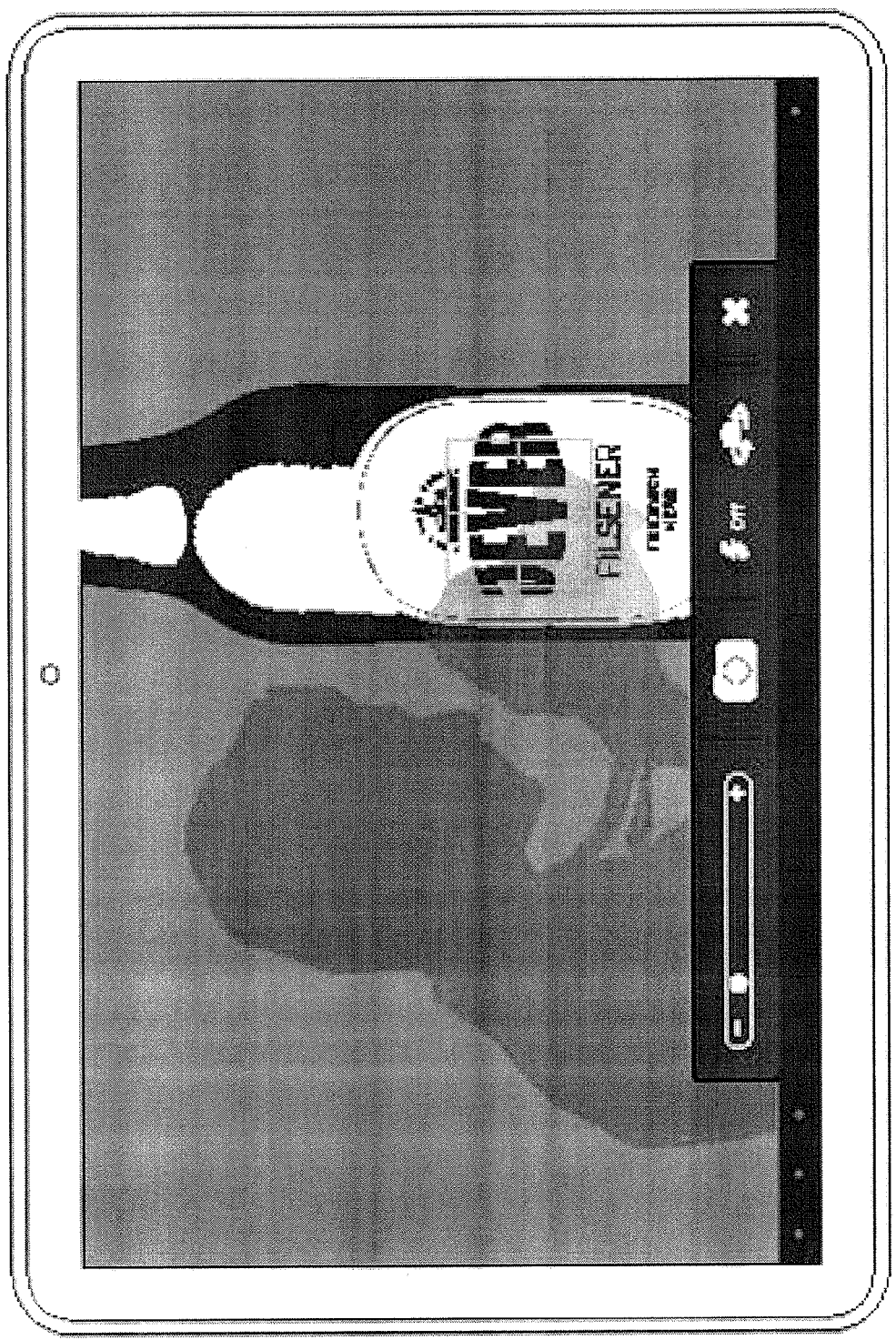
Figure 5D:
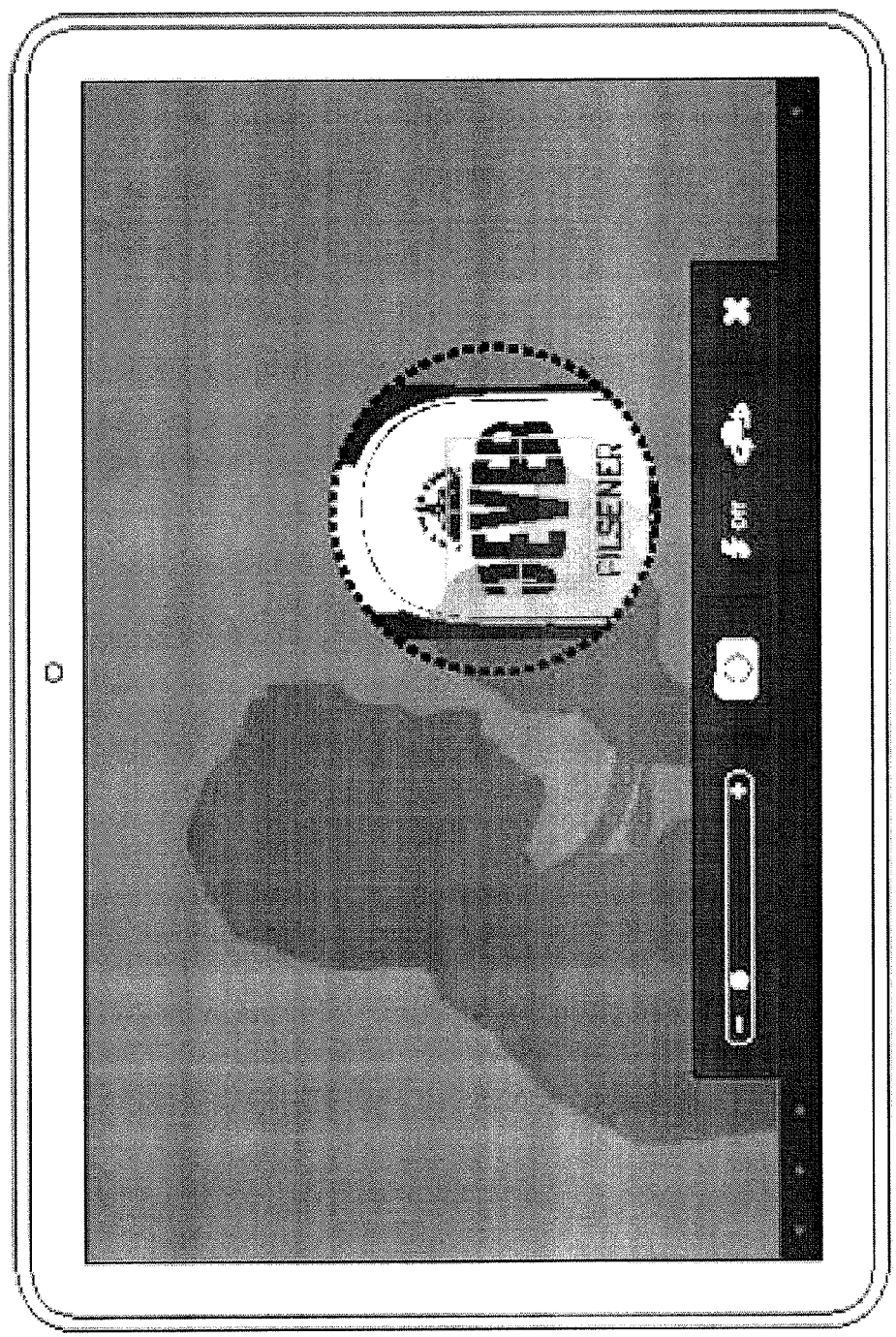
Figure 5E:
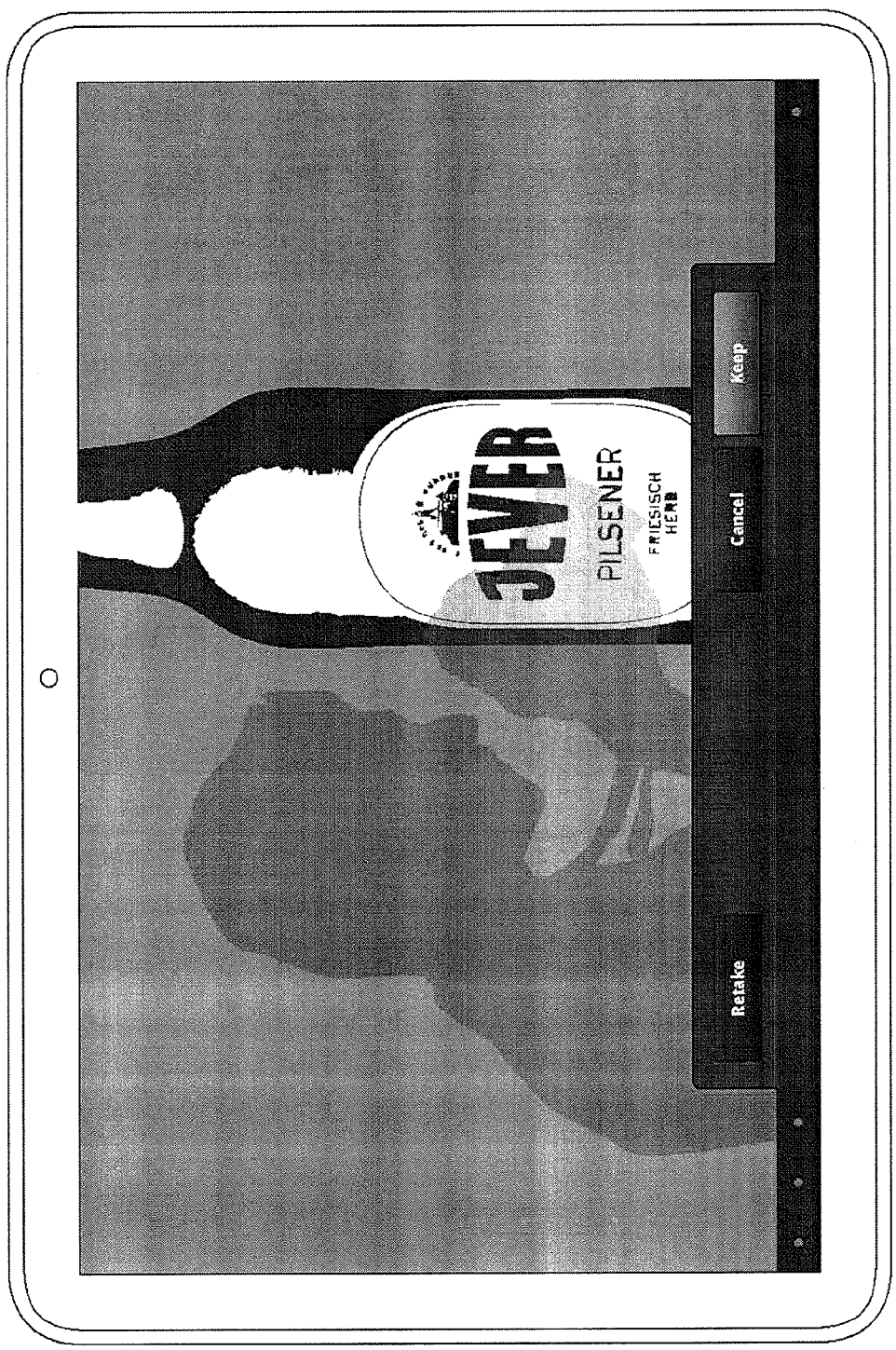
Figure 5F:
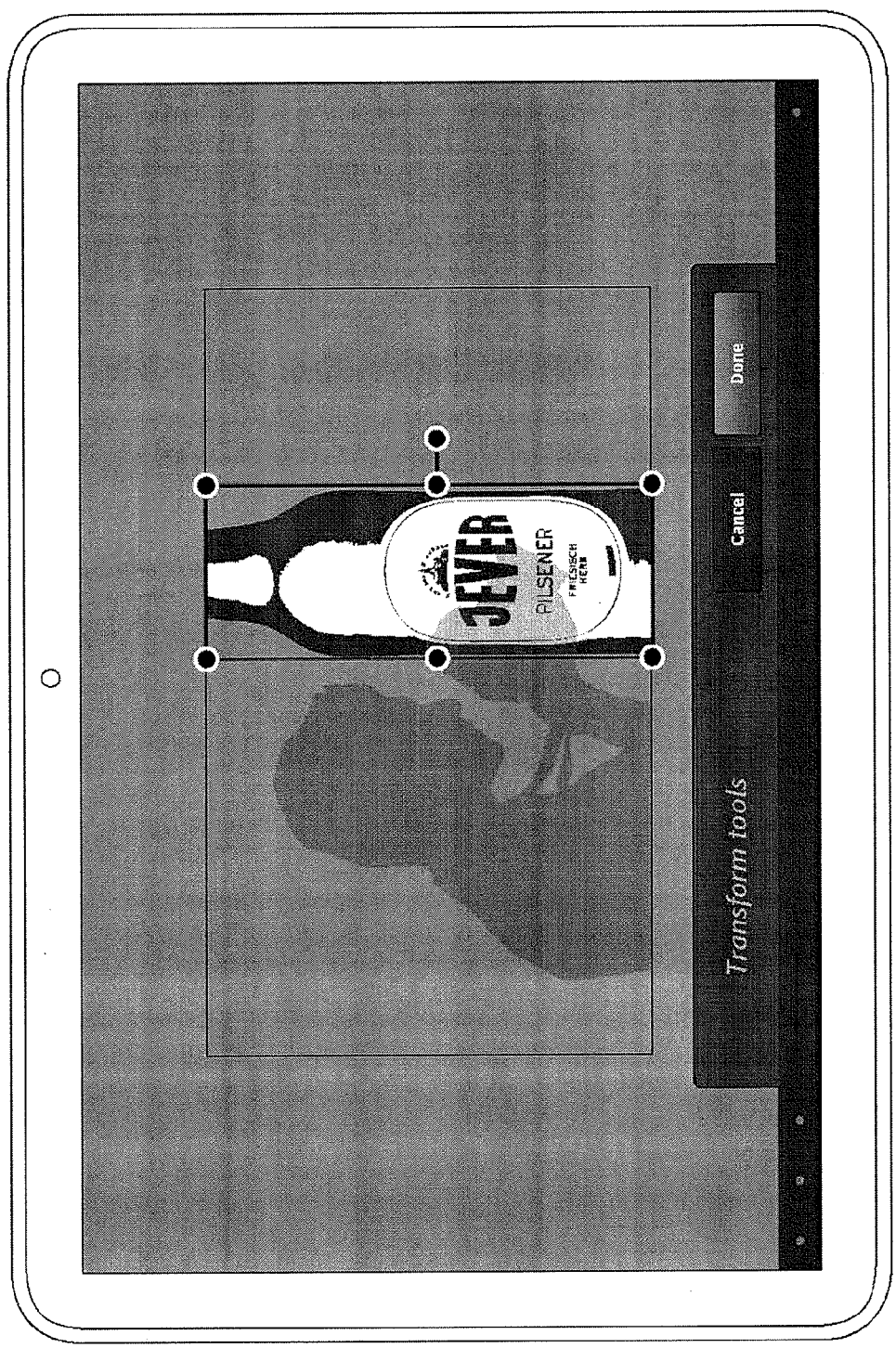
Figure 5G:
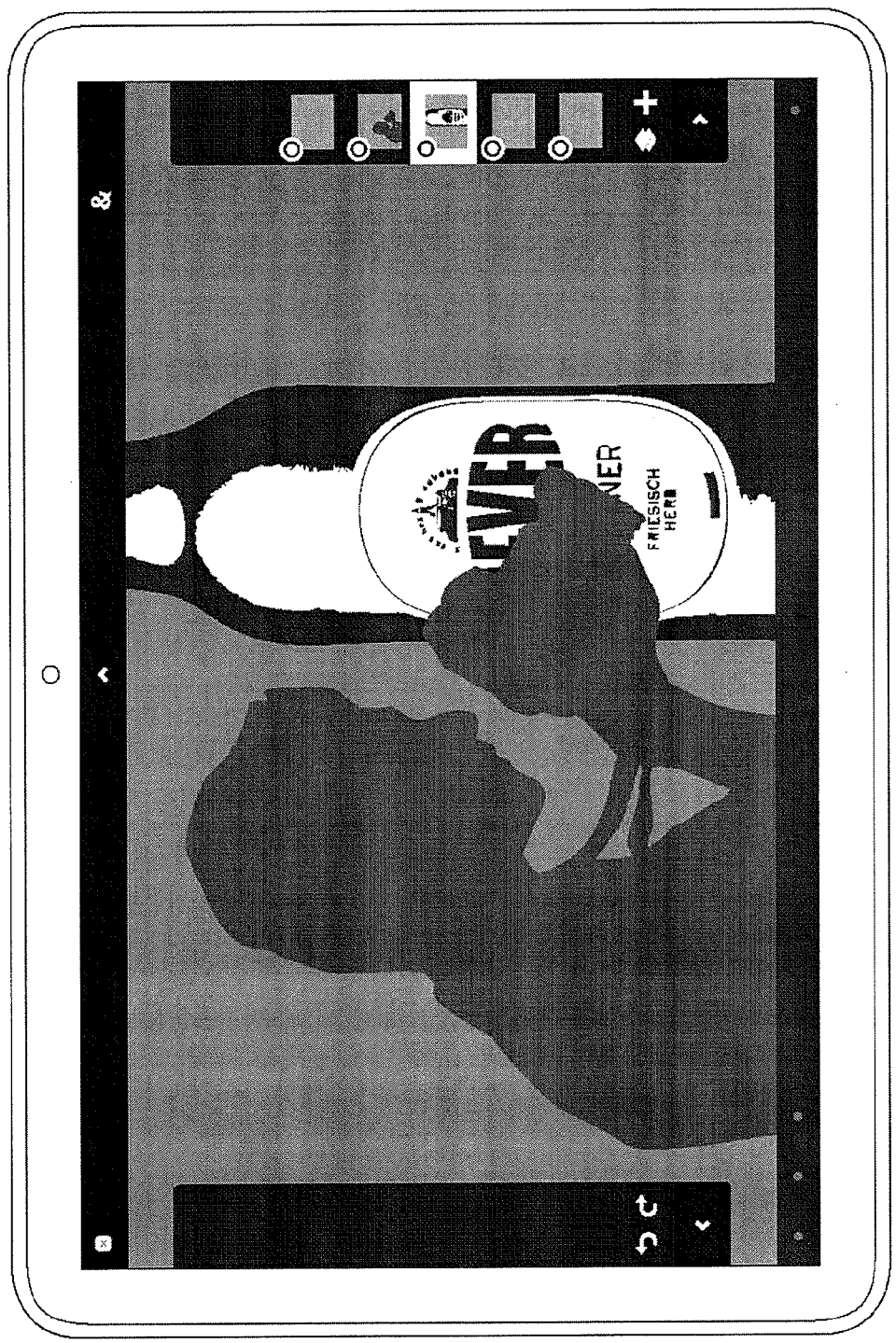
Figure 5H:
Figure 5I:
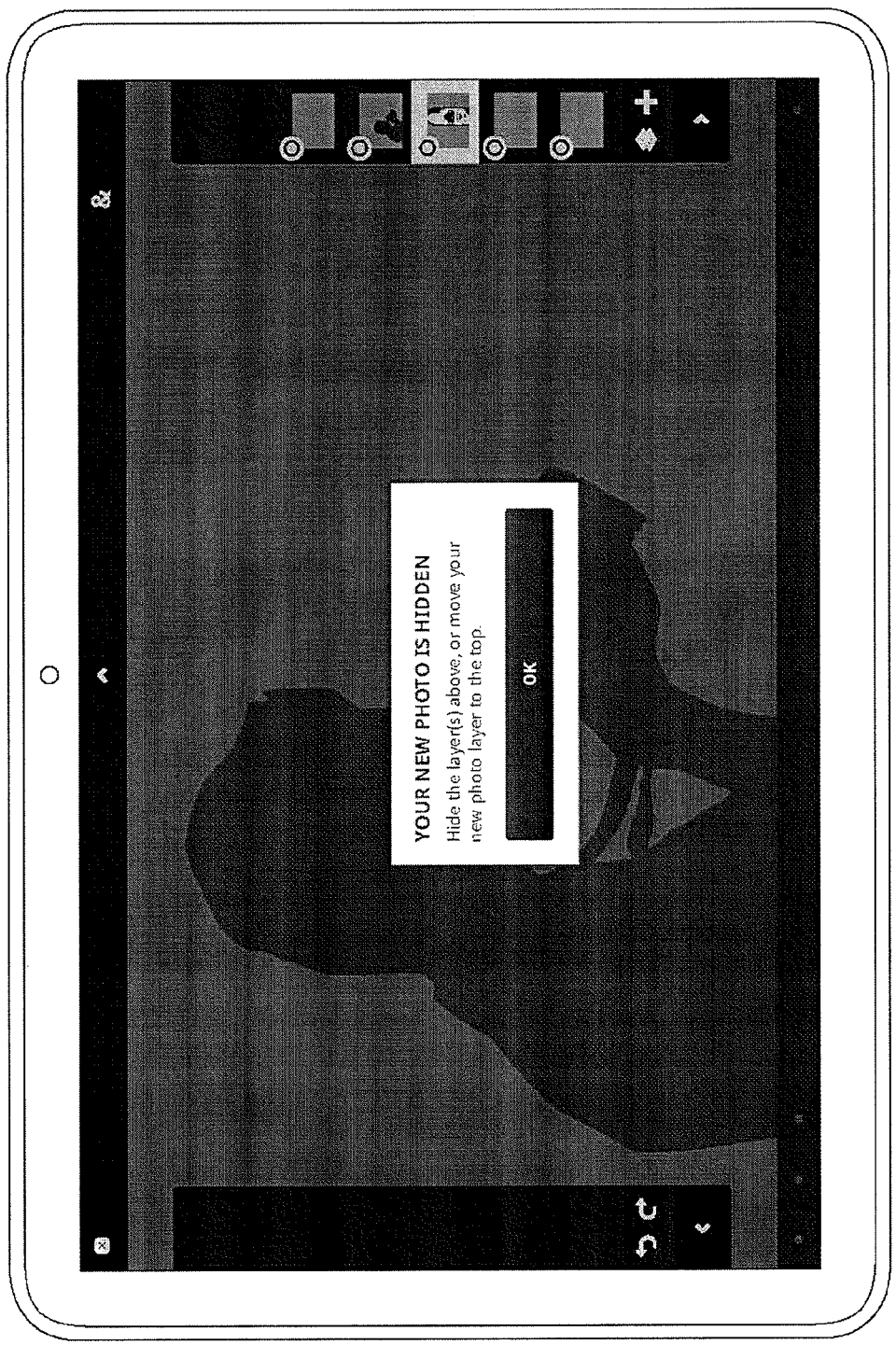
Figure 5J:
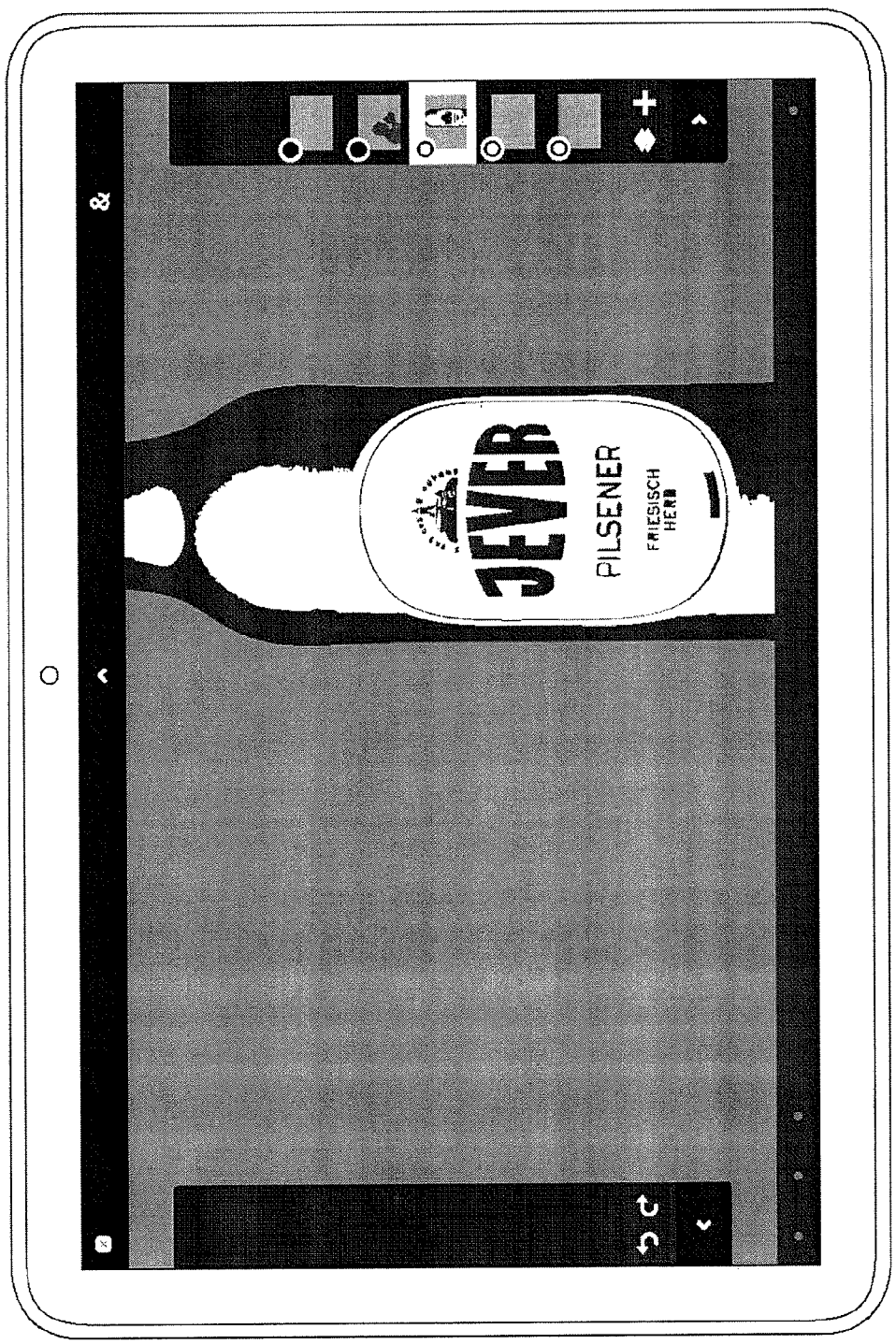

An input indicating that a camera fill view should be displayed may be received in any number of ways. For example, referring to FIG. 3, tablet computer 320 may comprise a touch-screen that can be used to receive input from a user of the tablet computer 320 that indicates that a camera fill view should be displayed. In one embodiment, an image editing application being executed on the tablet computer 320 displays an icon on the touch-screen display of the tablet computer 320. In this embodiment, when the touch-sensitive display of the tablet computer 320 is contacted at a location corresponding to the icon, then the camera fill view mode is displayed. For example, referring to the embodiment shown in FIG. 5A, when a user contacts the touch-screen of the electronic device 200 at a location corresponding to the icon, then a menu is displayed as shown in FIG. 5B. When the user contacts the touch-screen of the electronic device 200 at a location corresponding to the "Add Camera Fill" option on the menu, then a camera fill view is displayed as shown in FIG. 5C.

In another embodiment, if the electronic device 200 comprises or is in communication with a mouse, then a cursor for the mouse may be pointed to a location on the display corresponding to a camera fill option. In this embodiment, the camera fill view is displayed when a button associated with the mouse is clicked while the cursor is pointed to a location on the display corresponding to the camera fill option. In yet another embodiment, a particular key sequence may be received which indicates that a camera fill view should be displayed. For example, if the electronic device 200 receives a key sequence of "alt" and "c", then an image editing application being executed on the electronic device 200 may display a camera fill view. In one embodiment, pressing a particular button on the electronic device 200 may cause a camera fill view to be displayed on the display associated with the electronic device 200. In yet another embodiment, information may be received through a network interface of the electronic device 200, such as network interface 230, and the received information may indicate that a camera fill view should be displayed. Numerous other embodiments are disclosed herein and variations are within the scope of this disclosure.

Referring back to FIG. 4, after receiving the input indicating that the camera fill view should be displayed 415, the method 400 proceeds to block 420. In block 420, a camera view is displayed. For example, referring to FIG. 2, the electronic device 200 may display a live view from camera 250 on the display 240.

In one embodiment, the camera fill view displays a current live view from a camera in at least a portion of the selected layer. For example, referring to FIG. 2, a current live view from camera 250 may be displayed on display 240 in at least a portion of the selected layer of the image. In an embodiment, only the selected layer or a portion of the selected layer and the current live view from the camera are displayed in the camera fill view. In other embodiments, at least a portion of the selected layer, a current live view from the camera, and at least a portion of one or more other layers of the image are displayed. For example, referring to the embodiment shown in FIG. 5C, a portion of the second layer of the image is shown on the display as well as the live camera view in the selected layer (e.g. the third layer of the image).

In embodiments, one or more of the layers of the image shown in the camera fill view is at least partially transparent. In one embodiment, if a layer has a higher priority than the selected layer, then the layer is at least partially transparent. In this way, a user can view the live view from the camera even if a layer with a higher priority would normally prevent the selected layer from being viewed. In another embodiment, if a layer has a lower priority than the selected layer, then the layer may be at least partially transparent. A camera fill view may display only the layers of an image that are specified as being visible or may display at least a portion of both visible and invisible layers according to various embodiments.

In one embodiment, a camera fill view comprises one or more menus. For example, referring to FIG. 5C, a menu is displayed which allows a user to zoom in or zoom out of the current camera view, turn the camera's flash on or off, rotate the camera's angle, and capture the current camera view. As discussed below, in the embodiment shown in FIG. 5C, when a user contacts the touch-screen of the electronic device 200 at a location corresponding to the camera icon or selects that camera icon using an input device, then the current view of the camera is captured. Summarily, a user can zoom in on the current camera view by selecting the icon shown in Figure C and can zoom out on the current camera view by selecting the icon. Numerous other embodiments are disclosed herein and variations are within the scope of this disclosure.

In one embodiment, a user can select a portion of the selected layer in which to display the view from the camera. For example, referring to FIG. 5D, the user has selected a circle portion of the selected layer. In this embodiment, the live camera view is shown only in the circle portion of the selected layer. In various embodiments, any number of shapes such as circles, squares, rectangles, triangles, other shapes, and/or custom shapes may be selected for the selected layer and the live camera view may be shown in these selected portions of the selected layer. In one embodiment, the various shapes for the selected layer can be selected while the camera fill view is displayed. In another embodiment, the various shapes for the selected layer can be selected before the camera fill view is displayed, such as in step 410, or at any other suitable time. Numerous other embodiments are disclosed herein and variations are within the scope of this disclosure.

Referring back to FIG. 4, after displaying the camera view within the selected layer 420, the method 400 proceeds to block 425. In block 425, an input indicating that the current camera view should be captured is received.

An input indicating that the current camera view should be captured may be received in any number of ways. For example, referring to FIG. 3, tablet computer 320 may comprise a touch-screen that can be used to receive input from a user of the tablet computer 320 that indicates that a current camera view should be captured. In one embodiment, an image editing application being executed on the tablet computer 320 displays a menu having an icon that represents that the current camera view should be captured when pressed. For example, referring to the embodiments shown in FIGS. 5C and 5D, a menu is displayed which allows a user to zoom in or zoom out of the current camera view, turn the camera's flash on or off, rotate the camera's angle, and capture the current image view. In the embodiments shown in FIGS. 5C and 5D, when a user contacts the touch-screen of the electronic device 200 at a location corresponding to the camera icon, then the current view of the camera is captured.

In another embodiment, if the electronic device 200 comprises or is in communication with a mouse, then a cursor for the mouse may be pointed to a location on the display corresponding to the camera icon. In this embodiment, the current view from the camera is captured when a button associated with the mouse is clicked while the cursor is pointed to the location on the display corresponding to the camera icon. In yet another embodiment, a particular key sequence may be received which indicates that the current view of the camera should be captured. For example, if the electronic device 200 receive a key sequence of "alt" and "c", then an image editing application being executed on the electronic device 200 may capture the current view of the camera. Numerous other embodiments are disclosed herein and variations are within the scope of this disclosure.

Referring back to FIG. 4, after receiving the input indicating that the current camera view should be captured is received 425, the method 400 proceeds to block 430. In block 430 a determination is made as to whether the captured view should be kept. If a determination is made that the captured image should not be kept, the method 400 returns to block 420. If a determination is made that the captured image should be kept, then the method 400 proceeds to block 435. A determination as to whether the captured view should be kept may be made in any number of ways. In one embodiment, the determination as to whether to keep the captured view is automatically made by an image editing application being executed by the processor 220 of the electronic device 200. In other embodiments, the determination is based at least in part on input provided by a user of the electronic device 200. For example, referring FIG. 5E, a menu is displayed on the display of the electronic device 200. In this embodiment, the menu includes options such as "Retake" and "Keep". If a user selects the "Retake" option then the electronic device 200 may determine that the captured view should not be kept and that a new captured view is needed. If, however, the user selects the "Keep" option, then the electronic device 200 may determine that the captured view should be kept. Numerous other embodiments are disclosed herein and variations are within the scope of this disclosure.

Referring back to FIG. 4, after determining that the captured camera view should be kept 430, the method 400 proceeds to block 435. In block 435, at least a portion of the captured view is transformed. At least a portion of a captured view can be transformed in any number of ways. For example, referring to FIG. 3, tablet computer 320 may comprise a touch-screen that can be used to receive input from a user of the tablet computer 320 that indicates one or more transformations that should be made to the captured view. In one embodiment, an image editing application being executed on the tablet computer 320 displays one or more transformation tools and/or transformation options that a user can use to transform the captured view. For example, referring to FIG. 5F, the captured view may be cropped by contacting and moving locations around the perimeter of the captured view. In this way, the captured view can be modified by cropping at least a portion of the captured view. In other embodiments, the captured view may be transformed by resizing, rotating, moving, and/or any other suitable transformation or image modification.

In one embodiment, if the electronic device 200 comprises or is in communication with a mouse, then a cursor for the mouse may be pointed to a location on the display corresponding to a transformation tool and/or a transformation option. In this embodiment, the captured view can be transformed by depressing a button associated with the mouse while the cursor is pointed to a location of a transformation tool and/or by moving the cursor in a particular direction. In yet another embodiment, a particular key sequence may be received which indicates that a particular transformation should be performed. For example, if the electronic device 200 receives a key sequence of "ctrl" and "r", then an image editing application being executed on the electronic device 200 may reduce the size of the captured view. Numerous other embodiments are disclosed herein and variations are within the scope of this disclosure.

Referring back to FIG. 4, after transforming at least a portion of the captured view 435, the method 400 proceeds to block 440. In block 440, at least a portion of the image is displayed. For example, referring to FIG. 3, tablet computer 320 comprises a display and one or more layers or portions of one or more layers may be displayed on the display of the tablet computer 320. In one embodiment, the image is displayed based upon properties associated with the layers of the image. One or more layers of an image may be hidden from view and, therefore, may not be displayed on the display. For example, referring to FIG. 5J, layer one and layer two are hidden from view and, therefore, these layers are not displayed on the display 240 of the electronic device 200. If two layers are both selected as being visible, then a layer with a higher priority may be displayed on top of a layer with a lower priority. In this way, a portion of the lower-priority layer may not be displayed on the display of the tablet computer because of the higher-priority layer. For example, referring to FIG. 5G, each of the five layers of the image are selected as being viewable. However, in this embodiment, only a portion of the third layer is displayed on the display 240 of the electronic device 200 because the second layer has a higher priority than the third layer. Thus, the silhouette of a man holding a camera in the second layer of the image is displayed on top of the third layer and a portion of the third layer is not displayed on the display 240 of the electronic device 200. In one embodiment, an entire layer may not be visible because of a higher priority layer. For example, referring to FIG. 5I, the third layer of the image is not displayed because the second layer of the image is visible and has a higher priority than the third layer of the image. Numerous other embodiments are disclosed herein and variations are within the scope of this disclosure.

Referring back to FIG. 4, after displaying the image 440, the method 400 proceeds to block 445. In block 445, a message is displayed. For example, referring to FIG. 3, tablet computer 320 comprises a display and a message may be displayed on the display of the tablet computer 320. In one embodiment, the message is associated with the captured view. For example, referring to FIG. 5H, the message indicates which layer at least a portion of the captured view is located. Thus, in FIG. 5H, the message states "Your Photo is Here" and is directed towards the layer in which the captured view from the camera is location. In another embodiment, the message is associated with at least a portion of the image. For example, referring to FIG. 5I, the message indicates that the layer in which at least a portion of the captured view is located is not currently being displayed. In the embodiment shown in FIG. 5I, the captured photo in layer three of the image is not being displayed because a layer above layer three (e.g., layer one and/or layer two) is preventing layer three from being displayed. The message may also include instructions for displaying the layer that contains at least a portion of the captured view. For example, referring to FIG. 5I, the message states that the layer(s) above the third layer can be hidden so that the third layer will be displayed. As another example, still referring to FIG. 5I, the message also states that the third layer can be moved to the top of the layers so that this layer will be displayed. In other embodiments, a message may indicate locations, statuses, errors, or any other suitable message associated with the captured view, one or more layers in an image, and/or an image editing application. Numerous other embodiments are disclosed herein and variations are within the scope of this disclosure.

Referring back to FIG. 4, after displaying the message 445, the method 400 proceeds to block 450. In block 450, the image is saved. In one embodiment, the saved image includes at least a portion of the captured view. For example, referring to FIG. 5J, the image which comprises five layers with the third layer including at least a portion of the captured view is saved.

The image can be saved in any number of ways. In one embodiment, referring to FIG. 2, the processor 220 of the electronic device 200, stores the image in the memory 210. In another embodiment, the processor 220 of the electronic device 200, stores the image in one or more storage mediums such as a hard disk drive, flash drive, or another suitable storage device. In another embodiment, the electronic device 200 stores the image to another device through the network interface 230. For example, referring to FIG. 3, tablet computer 320 may store an image at web server 350 and/or data store 360 through network 310. The tablet computer 320 may send the image to the web server 350 in response to receiving a request from the web server and/or another computing device in communication with the tablet computer 320. In other embodiments, the tablet computer 320 pushes the image to the web server 350 and/or data store 360 without receiving a request from another device. The image may be stored by using an image editing application being executed on the electronic device 200. For example, referring to FIG. 2, the memory 210 may have program code stored thereon for an image editing application. In this embodiment, the processor 220 may receive the program code for the image editing application from memory 210 and execute at least a portion of the program code for the image editing application. In another embodiment, the processor 220 receive program code for an image editing application from another device through the network interface 230. For example, referring to FIG. 3, tablet computer 320 may receive program code for an image editing application stored at web server 350 and/or data store 360 through network 310. In this embodiment, the image editing application may contain instructions that cause the image to be stored in one or more storage devices. Numerous other embodiments are disclosed herein and variations are within the scope of this disclosure.

General

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A method comprising:
   in response to receiving, by an image editing application, selection of a layer from an image comprising at least two layers, selecting the layer in the image editing application;
   rendering, by the image editing application, a view from a camera in at least a portion of the selected layer;
   rendering, by the image editing application, a camera fill view, the camera fill view simultaneously including at least the layer from the image, the view from the camera, and a menu allowing a user to control an operation of the camera;
   in response to receiving, by the image editing application, an input indicating that the view from the camera should be captured, capturing the view from the camera;
   inserting, by the image editing application, the captured view from the camera into the at least the portion of the selected layer; and
   rendering, by the image editing application, a message corresponding to the inserted captured view and indicating the layer in which the captured view is located.

2. The method of claim 1, further comprising:
   receiving, by the image editing application, an image comprising a single layer; and
   adding, by the image editing application, an additional layer to the image.

3. The method of claim 1, wherein rendering, by the image editing application, a view from a camera in at least a portion of the selected layer comprises receiving, by the image editing application, an input indicating the at least the portion of the selected layer, wherein the view from the camera is shown only in the at least the portion of the selected layer.

4. The method of claim 1, wherein rendering, by the image editing application, a view from a camera in at least a portion of the selected layer comprises receiving, by the image editing application, an image signal from the camera, wherein the view comprises a live view of the image signal from the camera in the at least the portion of the selected layer.

5. The method of claim 1, wherein the view comprises at least one layer ordered above the selected layer, wherein the view is configured such that at least a portion of the selected layer is visible through the at least one layer ordered above the selected layer.

6. The method of claim 1, further comprising:
   transforming the captured view from the camera by cropping, resizing, moving, or rotating the captured view.

7. The method of claim 1, further comprising:
   rendering, by the image editing application, the image with the inserted captured image.

8. The method of claim 1, wherein the selection of the layer is based at least in part on an input for changing a focus of the layer for editing.

9. The method of claim 1, wherein the selection of the layer occurs automatically.

10. The method of claim 1, wherein the selection of the layer is based at least in part on a default layer of the image.

11. The method of claim 1, wherein rendering, by the image editing application, a message corresponding to the inserted captured view comprises:
    determining, by the image editing application, whether the selected layer of the rendered image is hidden; and
    in response to a determination that the selected layer of the rendered image is hidden, rendering, by the image editing application, the message corresponding to the inserted captured view, wherein the message indicates that the selected layer is hidden.

12. The method of claim 1, wherein the selection of the layer comprises:
    rending, by the image editing application, at least two layer representations corresponding to individual layers of the at least two layers; and
    receiving, by the image editing application, a first input from the input device, the first input indicating selection of a layer representation corresponding to the layer from the at least two layers.

13. The method of claim 1, further comprising:
    receiving, by the image editing application and prior to rendering the view from the camera, one or more inputs at the menu adjusting the operation of the camera.

14. The method of claim 13, wherein the one or more inputs at the menu adjusting the operation of camera comprise at least one of zooming in the camera, zooming out the camera, turning on a flash, turning off the flash, and rotating an angle associated with the view from the camera.

15. A non-transitory computer-readable medium, comprising program code for:
    in response to receiving, by an image editing application, selection of a layer from an image comprising at least two layers, selecting the layer in the image editing application;
    rendering, by the image editing application, a view from a camera in at least a portion of the selected layer;
    rendering, by the image editing application, a camera fill view, the camera fill view simultaneously including at least the layer from the image, the view from the camera, and a menu allowing a user to control an operation of the camera;
    in response to receiving, by the image editing application, an input indicating that the view from the camera should be captured, capturing the view from the camera;
    inserting, by the image editing application, the captured view from the camera into the at least the portion of the selected layer; and
    rendering, by the image editing application, a message corresponding to the inserted captured view and indicating the layer in which the captured view is located.

16. The non-transitory computer-readable medium of claim 15, wherein rendering, by the image editing application, a view from a camera in at least a portion of the selected layer comprises program code for:
    receiving, by the image editing application, an image signal from the camera, wherein the view comprises a live view of the image signal from the camera in the at least the portion of the selected layer.

17. The non-transitory computer-readable medium of claim 15, wherein the view comprises at least one layer from the at least two layers, wherein the at least one layer is ordered above the selected layer and wherein the at least one layer ordered above the selected layer is at least partially transparent.

18. The non-transitory computer-readable medium of claim 15, wherein rendering, by the image editing application, a message corresponding to the inserted captured view comprises program code for:
  determining, by the image editing application, whether the selected layer of the rendered image is hidden; and
  in response to a determination that the selected layer of the rendered image is hidden, rendering, by the image editing application, the message corresponding to the inserted captured view, wherein the message indicates that the selected layer is hidden.

19. A system comprising:
  a display;
  a camera;
  an input device;
  a memory; and
  a processor in communication with the display, the camera, the input device, and the memory, the processor configured for:
    rendering, by an image editing application, an image comprising a plurality of layers on the display;
    rendering, by the image editing application and on the display, layer representations corresponding to individual layers of the plurality of layers;
    receiving, by the image editing application, a first input from the input device, the first input indicating selection of a layer representation corresponding to a layer from the plurality of layers;
    in response to receiving, by the image editing application, the first input, selecting the layer in the image editing application;
    rendering, by the image editing application, a view from the camera in at least a portion of the selected layer on the display;
    rendering, by the image editing application, a camera fill view, the camera fill view simultaneously including the layer, the view from the camera, and a menu allowing a user to control an operation of the camera;
    receiving, by the image editing application, a second input from the input device, the second input indicating that the view from the camera should be captured;
    in response to receiving, by the image editing application, capturing the view from the camera; and
    inserting, by the image editing application, the captured view from the camera into the at least the portion of the selected layer.

20. The system of claim 19, wherein the processor is further configured for rendering, by the image editing application, a message corresponding to the inserted captured view, the message indicating the layer in which the captured view is located.

* * * * *